United States Patent
Liu (10) Patent No.: US 9,702,339 B2
(45) Date of Patent: Jul. 11, 2017

(54) WIND TURBINE BLADES WITH CAP-ASSISTED BOND CONFIGURATION AND ASSOCIATED BONDING METHOD

(75) Inventor: Lihua Liu, XuanZhou (CN)

(73) Assignee: General Electric Company, Schenectady, NY (US)

(*) Notice: Subject to any disclaimer, the term of this patent is extended or adjusted under 35 U.S.C. 154(b) by 489 days.

(21) Appl. No.: 14/353,782

(22) PCT Filed: Nov. 1, 2011

(86) PCT No.: PCT/CN2011/081633
§ 371 (c)(1),
(2), (4) Date: Apr. 24, 2014

(87) PCT Pub. No.: WO2013/063760
PCT Pub. Date: May 10, 2013

(65) Prior Publication Data
US 2014/0294593 A1    Oct. 2, 2014

(51) Int. Cl.
*F01D 5/14* (2006.01)
*F03D 1/06* (2006.01)
(Continued)

(52) U.S. Cl.
CPC ............ *F03D 1/0675* (2013.01); *B29C 65/48* (2013.01); *B29C 66/324* (2013.01); *B29C 66/54* (2013.01);
(Continued)

(58) Field of Classification Search
USPC ..................................... 416/229 R
See application file for complete search history.

(56) References Cited

U.S. PATENT DOCUMENTS 2,693,922 A * 11/1954 Ellison ............... B64C 3/00
   114/357
6,513,757 B1   2/2003 Amaoka et al.
(Continued)

FOREIGN PATENT DOCUMENTS

WO    WO 2009/155920 A1    12/2009

OTHER PUBLICATIONS

DK Office Action issued in connection with corresponding Application No. PA201470278 on Sep. 23, 2014.
(Continued)

*Primary Examiner* — R. K. Arundale
(74) *Attorney, Agent, or Firm* — Dority & Manning, P.A.

(57) ABSTRACT

A wind turbine blade (16) includes an upper shell member (20) and a lower shell member (22) with an internal cavity (25) therebetween. The shell members are joined with a bond paste (34) at respective bond lines (36, 37) along leading and trailing edges (24, 26) of the blade. A cap (50) is disposed within the internal cavity between the upper and lower shell members along at least one of the leading or trailing edge bond lines. The cap includes a head (52) oriented towards the blade edge and trailing leg portions (56) that span rearward from the head in biased engagement the upper and lower shell members. The cap defines a dam at the bond line against migration of excess bond paste further into the internal cavity. A method is also provided for forming bond lines at the leading or trailing edge with the bond paste caps.

6 Claims, 6 Drawing Sheets

(51) Int. Cl.
  *B29C 65/48* (2006.01)
  *B29C 65/00* (2006.01)
  *B29L 31/08* (2006.01)

(52) U.S. Cl.
  CPC ..... *B29L 2031/085* (2013.01); *F05B 2230/23* (2013.01); *Y02E 10/721* (2013.01); *Y02P 70/523* (2015.11); *Y10T 156/10* (2015.01); *Y10T 156/108* (2015.01)

(56) References Cited

U.S. PATENT DOCUMENTS

| | | | |
|---|---|---|---|
| 6,945,727 | B2 | 9/2005 | Christman et al. |
| 7,037,568 | B1 | 5/2006 | Rogers et al. |
| 7,244,487 | B2 | 7/2007 | Brantley et al. |
| 7,841,835 | B2 | 11/2010 | Bagepalli et al. |
| 7,918,653 | B2 | 4/2011 | Standish et al. |
| 8,105,045 | B2 | 1/2012 | Stewart |
| 8,235,671 | B2 | 8/2012 | Yarbrough |
| 8,257,048 | B2 | 9/2012 | Yarbrough |
| 8,262,362 | B2 | 9/2012 | Yarbrough |
| 8,393,871 | B2 | 3/2013 | Yarbrough |
| 8,409,381 | B2 * | 4/2013 | Ramm ................. F03D 1/0675 156/125 |
| 2003/0037867 | A1 | 2/2003 | Bersuch et al. |
| 2007/0110584 | A1 | 5/2007 | Stommel |
| 2009/0146433 | A1 | 6/2009 | Althoff et al. |
| 2009/0226702 | A1 * | 9/2009 | Madsen .............. B29C 65/5028 428/317.1 |
| 2010/0162567 | A1 | 7/2010 | Kirkwood et al. |
| 2011/0008175 | A1 | 1/2011 | Gau |
| 2011/0142663 | A1 | 6/2011 | Gill |
| 2011/0142670 | A1 | 6/2011 | Pilpel et al. |
| 2011/0142674 | A1 | 6/2011 | Dixon et al. |
| 2011/0211969 | A1 | 9/2011 | Nies |
| 2011/0211970 | A1 | 9/2011 | Nies |
| 2012/0027610 | A1 | 2/2012 | Yarbrough |
| 2012/0027613 | A1 * | 2/2012 | Yarbrough .............. F03D 1/065 416/226 |
| 2012/0027614 | A1 * | 2/2012 | Yarbrough .............. F03D 1/065 416/226 |
| 2013/0108455 | A1 * | 5/2013 | Quiring ................ F03D 1/0675 416/233 |
| 2014/0294591 | A1 * | 10/2014 | Liu .......................... F16B 2/10 416/226 |
| 2016/0123298 | A1 * | 5/2016 | Caruso ................... F03D 1/003 416/61 |

OTHER PUBLICATIONS

PCT Search Report, Aug. 2, 2012.
Danish Sech Report, Sep. 23, 2014.

* cited by examiner

WIND TURBINE BLADES WITH CAP-ASSISTED BOND CONFIGURATION AND ASSOCIATED BONDING METHOD

FIELD OF THE INVENTION

The present invention relates generally to the field of wind turbines, and more particularly to turbine blades having an improved leading or trailing edge bond line.

BACKGROUND OF THE INVENTION

Turbine blades are the primary elements of wind turbines for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

The turbine blades typically consist of an upper (suction side) shell and a lower (pressure side) shell that are bonded together at bond lines along the trailing and leading edges of the blade. The bond lines are generally formed by applying a suitable bonding paste or compound along the bond line at a minimum designed bond width between the shell members. The bond paste, however, tends to migrate well past the designed bond width and into the interior blade cavity, particularly along the trailing edge of the blade. This excess bond paste can add considerable weight to the blade and, thus, adversely affect blade efficiency and overall performance of the wind turbine. The excess bond paste can also break off and cause damage to interior structure and components during operation of the wind turbine.

Accordingly, the industry would benefit from an improved bond line configuration that reduces the amount of excess bond paste that migrates into the blade cavity, particularly along the trailing edge of the turbine blade.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine blade is provided having an upper shell member and a lower shell member. The shell members define an internal cavity therebetween and are joined at leading and trailing edges of the blade with a bond paste along a bond line having a designed width. A bond paste cap is disposed within the internal cavity between the upper and lower shell members along at least one of the leading or trailing edge bond lines. The cap includes a head oriented towards the respective edge and trailing leg portions that span rearward from the head in biased engagement against the upper and lower shell members. With this configuration, the cap defines a dam at the bond line against migration of excess bond paste further into the internal cavity.

The cap may be variously configured such that the bond paste forms between the leg portions and the upper and lower shell members along at least a portion of the leg members. For example, the leg members may extend at a generally constant angle from the head, such as in a V-shaped configuration. In an alternate embodiment, the legs may be arcuate, staggered, or have some other rearwardly extending profile.

In certain embodiments, the cap may be a pre-formed member with generally stiff (shape-maintaining) leg members that extend rearwardly from the head and have a length, angular orientation, and flexure relative to the head so as to be biased against the upper and lower shell members. In an alternate embodiment, the cap may be formed as a generally flat component that is bent into an operational configuration at the bond line by a pulling force exerted on the head. In this embodiment, a bending relief may be defined at the head to ensure the final desired operational shape of the cap.

The cap may be formed of various suitable materials, and the invention is not limited to any particular material. In one embodiment, the cap is formed of a material that is permeable to air and impermeable to the bond paste.

The present invention also encompasses various method embodiments for forming a bond between the upper and lower shell members of a wind turbine blade along at least one of the leading or trailing edges of the blade. The methods include placing an amount of bond paste along a defined bond line location of the leading or trailing edge. A cap is then placed into one of the shell members at an initial position inboard of the bond paste along the bond line, with the cap having a head oriented towards the bond line and trailing leg portions that span rearward from the head. Alternatively, the cap may be placed concurrent with, or before, placement of the bond paste. Actuation lines, such as strings, cables, lines, and the like, are attached to the head and are led out from the shell member beyond the leading or trailing edge. The shell members are joined along the leading and trailing edges such that the trailing leg portions of the cap are biased against the shell members. The actuation lines are then pulled to move the cap towards the leading or trailing edge to an operational position that defines a desired bond width location. The cap thus defines a dam against migration of excess bond paste into the internal cavity of the blade and the trailing leg portions compress the bond paste and cause excess bond paste and air to be forced out from the leading or trailing edge as the cap is pulled towards its operational position.

The invention also encompasses a wind turbine having one or more turbine blades configured with the unique bond line configuration described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

Figure 1:
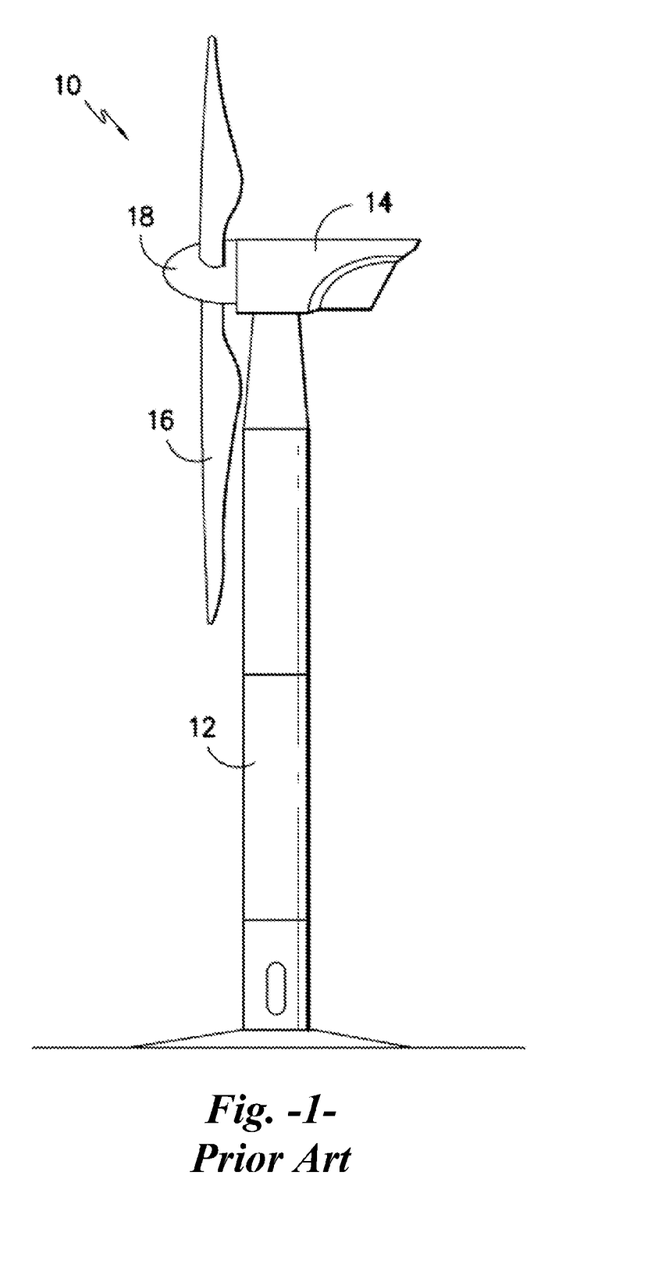
FIG. 1 is a perspective view of a conventional wind turbine.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
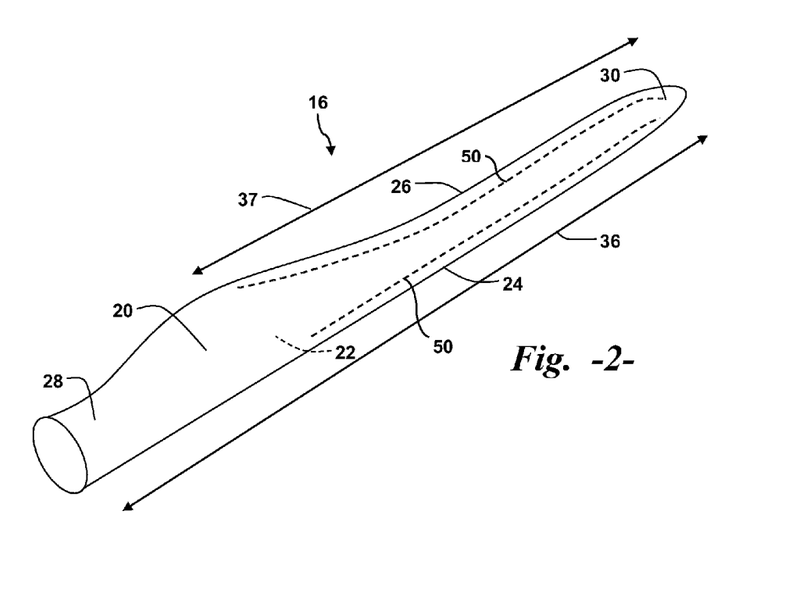
FIG. 2 is a perspective view of an embodiment of a wind turbine blade.
Figure 3:
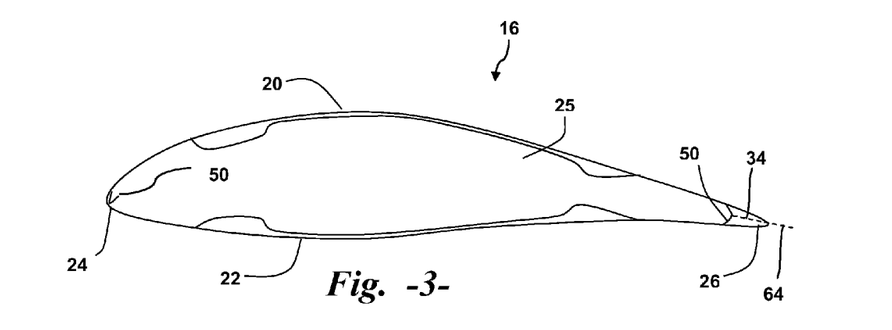
FIG. 3 is a cross-sectional view of an exemplary wind turbine blade in accordance with aspects of the invention.

FIGS. 2 and 3 provide a more detailed view of a wind turbine blade 16. The blade 16 includes an upper shell member 20 and a lower shell member 22, with an internal cavity 25 defined between the shell members. The upper shell member 20 may be configured as the suction side surface of the blade 16, while the lower shell member 20 may be configured as the pressure side surface of the blade. The blade 16 includes a leading edge 24 and a trailing edge 26, as well as a root portion 28, and a tip portion 30. As is well known in the art, the upper shell member 20, and lower shell member 22 are joined together at a bond line 36 along the leading edge 24 and along a bond line 37 at the trailing edge 26. In formation of these bond lines 36, 37, a bond paste 34 in flowable viscous form is applied between the mating laminate surfaces of the shell members 20, 22 along the length of the bond lines 36, 37. It should be appreciated that the term "bond paste" is used herein in a generic sense to encompass any type of adhesive or bonding material that is applied in an initially flowable state. The particular type of bond paste 34 is not particularly relevant to the present invention, and any suitable type of epoxy, compound, or other material may be used in this regard.

The bond paste 34 is typically applied in a sufficient quantity and pattern so as to establish a designed bond line width 38 (FIG. 4) at the leading edge 24 and trailing edge 26 that ensures a minimum bonded surface area between the components along the length of the respective bond lines 36, 37. The design criteria for the bond width 38 and thickness may vary between different types of blades based on any combination of design factors, as is well understood by those skilled in the art.

A particular problem associated with the conventional system and method for application of the bond paste 34 is that excess bond paste is squeezed out from between the mating surfaces of the shell members 20, 22 into the internal cavity 25 and eventually cures as a hardened mass that adds significant weight to the blade 16. The excess mass of bond paste does not add any degree of structural integrity or other useful purpose to the blade 16 and, if dislodged, results in a rattling noise from the blades in operation of the turbine, which is a common complaint from wind turbine operators.

Still referring to FIGS. 2 and 3, a cap 50 is disposed within the internal cavity 25 between the upper and lower shell members 20, 22 along either or both of the leading or trailing edge bond lines 36, 37. The cap 50 need not extend along the entire length of the bond lines 36, 37, as depicted in FIG. 2, and may extend along any portion or portions of the respective bond lines wherein the benefits of the cap 50 are desired, as discussed in greater detail below. In the embodiment of FIGS. 2 and 3, respective bond caps 50 are disposed along the leading edge bond line 36 and the trailing edge bond line 37.

Figure 4:
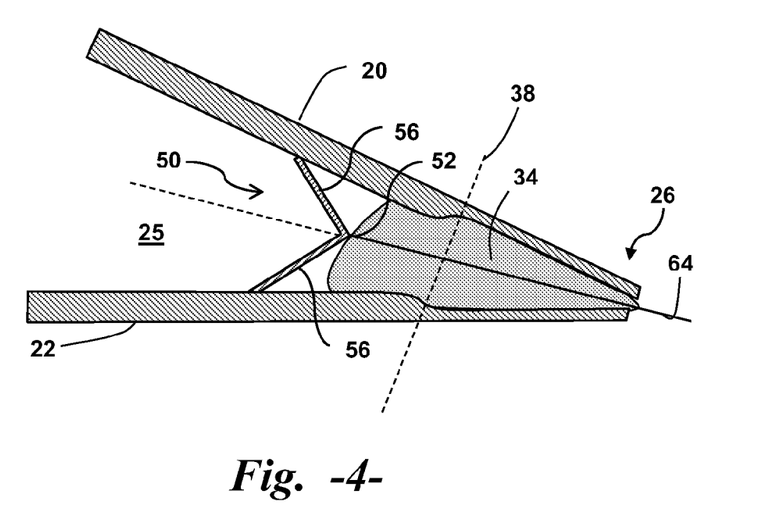
FIG. 4 is an enlarged cross-sectional view of the trailing edge of a wind turbine blade with a bond cap in accordance with aspects of the invention.
Figure 5:
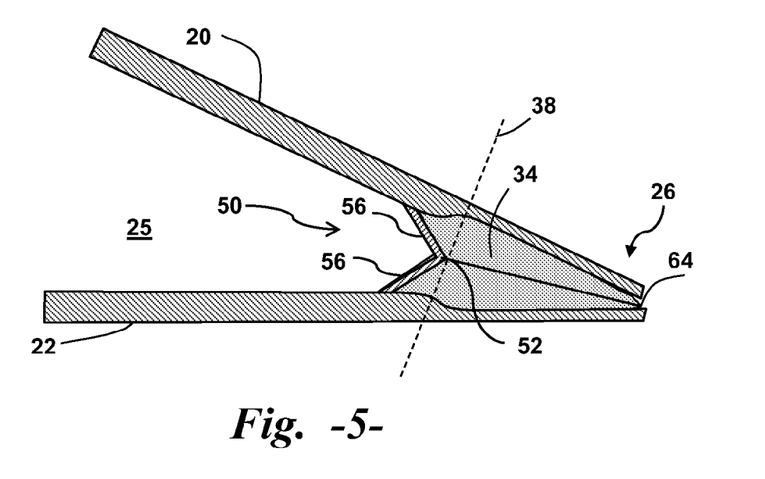
FIG. 5 is a cross-sectional view of the embodiment of FIG. 4 with the bond cap in its operational position.

Referring to FIGS. 4 and 5, a particular embodiment is illustrated wherein the cap 50 is configured with a head 52 that is oriented towards the respective bond line, in this case the trailing edge bond line. Trailing leg portions 56 span rearward from the head 52 at an angle and length so as to be biased into frictional engagement against the upper and lower shell members 20, 22. FIG. 4 depicts the cap 50 in an initial position between the shell members 20, 22. FIG. 5 depicts the cap 50 after it has been deployed to its operational position such that the head 52 is positioned generally at a location 38 corresponding to a desired bond width. The trailing legs 56 flex inward towards the head 52 as the cap 50 is pulled into the position illustrated in FIG. 5.

It should be appreciated from FIGS. 4 and 5 that, when the cap 50 is positioned into its operational position depicted in FIG. 5, the cap defines an inwardly oriented dam along the bond line against migration of excess bond paste 34 further into the internal cavity 25. It should also be appreciated that, upon movement of the cap 50 from the position of FIG. 4 to the position of FIG. 5, air that may be trapped within the bond paste 34 is forced out through the open trailing edge 26 between the shell members 20, 22, thereby reducing the likelihood of detrimental air pockets or voids forming in the cured bond paste 34. In addition, the cap 50 helps to form a smooth, rounded bond edge, which minimizes local stress concentrations in the bond paste 34.

The cap 50 may be formed from various suitable materials, or combination of materials, to achieve the desired characteristics of the device. For example, the cap 50 may be formed from a material that is permeable to air yet impermeable to the bond paste. With this type of material, air that may be trapped within the bond paste 34 may also escape through the cap 50 as the cap is moved into its operational position. For example, the cap 50 may be formed from a common base material that is an open weave mesh material having the desired permeability characteristics. The base material may be treated or modified so that it is substantially impermeable to the bond paste 34, but remains permeable to air. For example, a coating, such as a suitable resin, may be applied to the base material to render the material substantially impermeable to the bond paste 34.

Figure 8:
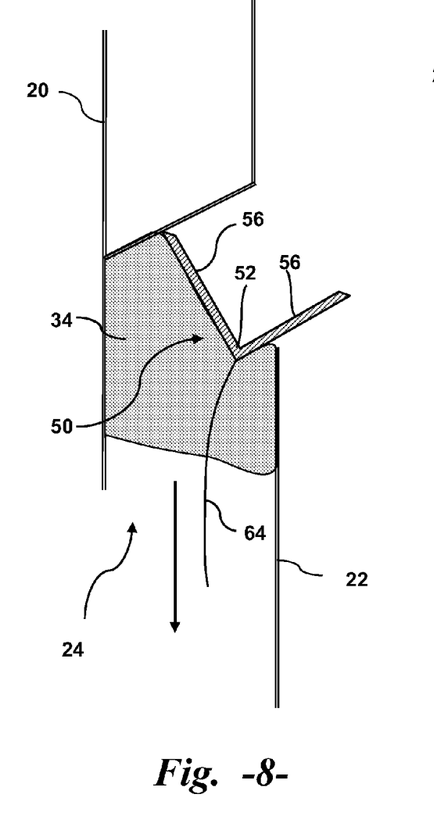
FIG. 8 is a side cut-away view of a bond cap configuration at the leading edge of a wind turbine blade with the bond cap at an initial position.
Figure 9:
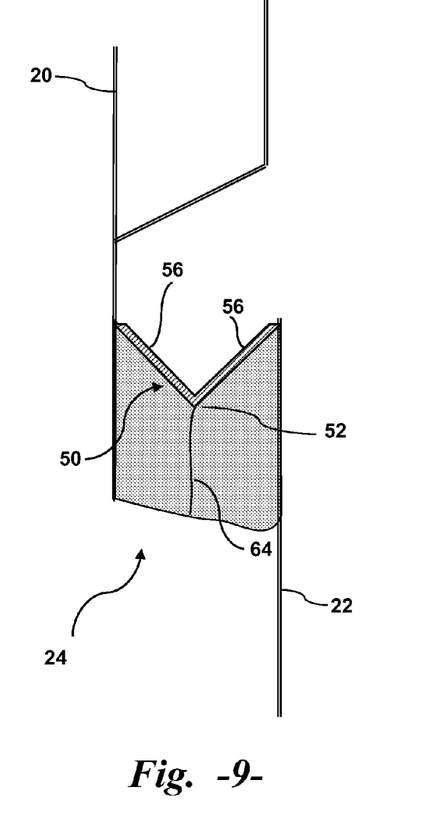
FIG. 9 is a side cut-away view of the embodiment of FIG. 8 with the bod cap at its operational position.

As mentioned, a suitable cap 50 in accordance with aspects of the invention may be utilized along either or both of the leading 24 or trailing edges 26. In the embodiment depicted in FIGS. 4 and 5, the cap is positioned along the trailing edge 26 bond line. FIGS. 8 and 9 depict an embodiment wherein a cap 50 is utilized along the bond line formed at the leading edge 24 between overlapping in regions of the upper 20 and lower 22 shell members.

The bond cap 50 may be variously configured within the scope of the invention. For example, in the embodiment depicted in FIGS. 4 and 5, the cap 50 is configured such that the bond paste 34 forms between the leg portions 56 and the upper and lower shell members 20, 22, along at least a portion of the leg members 56. This configuration produces a stress relieving profile in the inward end of the bond paste.

The leg members 56 may, in certain embodiments, extend away from the head 52 at a generally constant angle, as depicted in FIGS. 4 and 5. In alternate embodiments, the legs 56 may extend at varying angles and may be, for example, arcuate-shaped. In still alternative embodiments, the leg members 56 may have a staggered or step-wise configuration with an overall general orientation from the head 52 in opposite directions towards the upper and lower shell members 20, 22.

A particular embodiment of the cap 50 is illustrated in the figures as a generally V-shaped component wherein the legs 56 diverge at a generally constant angle at the head 52. This configuration may be desired in that it provides adequate flexure for the legs 56 as they are moved into their operational position illustrated in FIG. 5.

Figure 7:
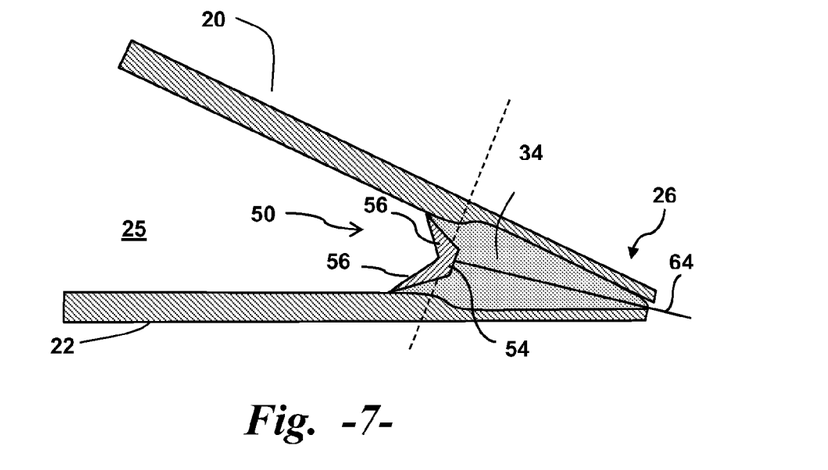
FIG. 7 is a cross-sectional view of yet another embodiment of a trailing edge bond cap configuration; perspective view of a sleeve embodiment.

In an alternative embodiment illustrated, for example, in FIG. 7, the cap has a configuration wherein the head is defined as a generally flat section 54 that spans traversely along at least a portion of the bond width line 38. The bond cap 50 has, in this particular embodiment, a generally echelon-shape. The legs 56 in this particular embodiment will not have the degree of flexure as the legs 56 in the embodiment of FIG. 5, but may be desired in certain types of blade configurations.

The cap 50 may, in particular embodiments, be a preformed member wherein the trailing leg members 56 are relatively stiff and maintain their angular position relative to the head 52 in an unrestrained state of the cap 50. The trailing leg members 56 in this embodiment extend rearwardly from the head 52 and have a length, angular orientation, and flexure relative to the head 52 so as to be biased against the upper and lower shell members at least in the final operational position of the cap 50. Referring to FIG. 4, it may be desired that the pre-formed cap 50 also have a size and configuration such that the legs 56 engage against the upper and lower shell members 20, 22 in the initial position of the cap 50 so as to define an initial boundary for the bond paste 34 during the bonding and curing process.

Figure 6:
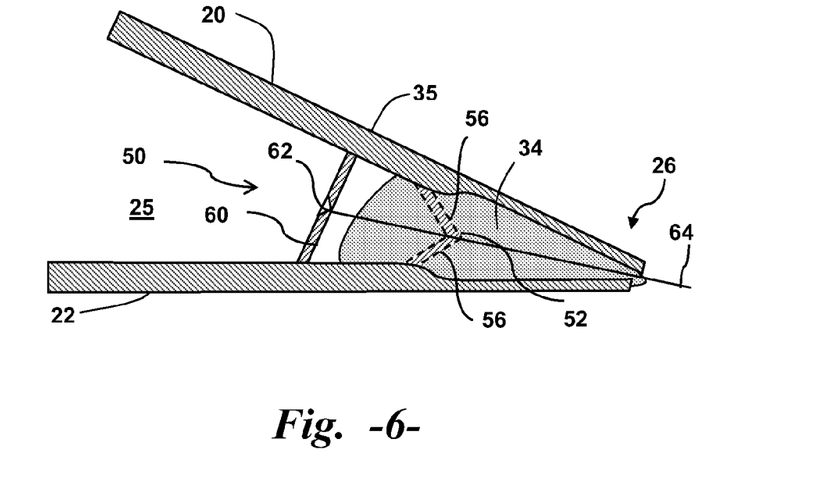
FIG. 6 is a cross-sectional view of a different embodiment of a trailing edge bond cap configuration.

FIG. 6 illustrates an embodiment wherein the bond cap 50 is initially provided as a relatively flat member 60, such as a plate member. The flat member 60 is initially placed at the position illustrated in FIG. 6 and then moved into an operational position illustrated by the dashed line configuration in FIG. 6 by exerting a pulling force on the plate member 60 towards the trailing edge 26. This pulling force causes the plate member 60 to bend into the V-shaped configuration illustrated by the dashed lines in FIG. 6. Any manner of bending relief 62 may be defined in the flat member 60 at the point of desired bending of the flat member 60.

Figure 10:
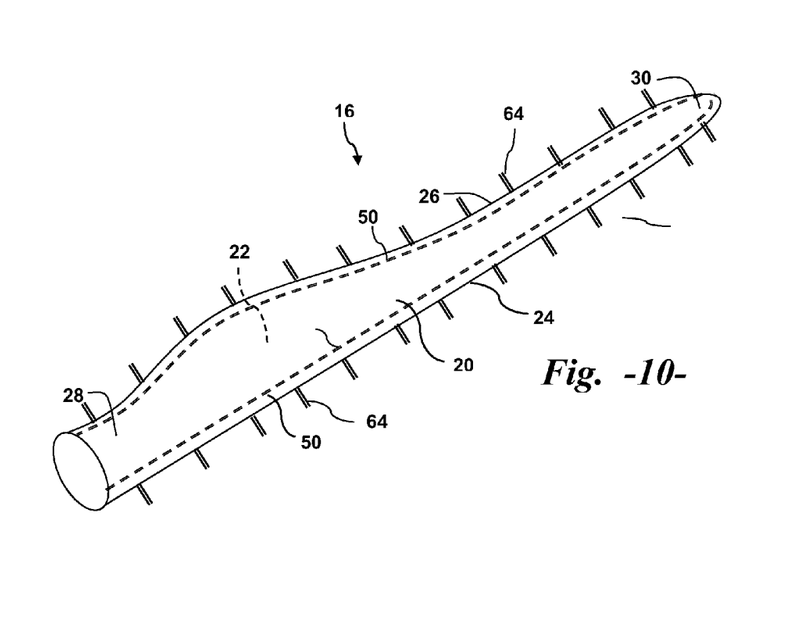
FIG. 10 is a perspective view of a wind turbine blade with actuation lines along the leading and trailing edges of the blade.
Figure 11:
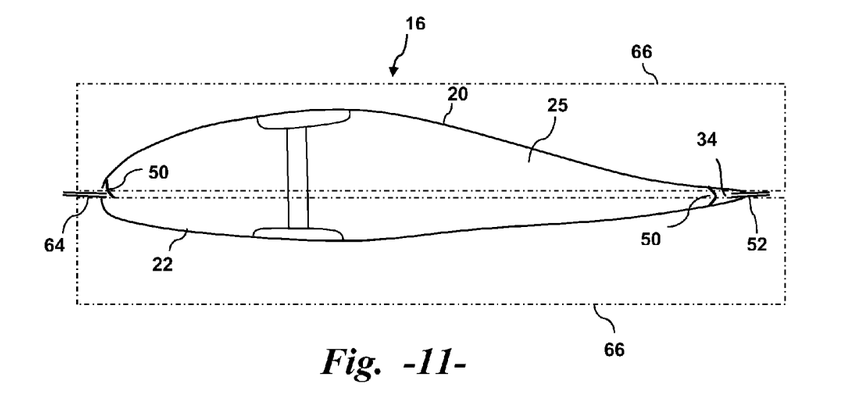
FIG. 11 is a side cut-away view of upper and lower shell members within respective molds with bond caps and actuation lines at the leading and trailing edges of the blade.

Referring again to FIGS. 4 and 5, the bond cap 50 is moved from its initial position into its final operational position by application of a pulling force on the head 52 towards the trailing edge 26. For this, any manner of actuation lines 64 may be provided along the length of the cap 50. These lines 64 may be, for example, strings, cables, wires, or any other type of line component that is suitable for pulling the cap 50 into its operational position and causing excess bond paste 34 to be expelled through the opened trailing end 26 between the upper and lower shell members 20, 22. Referring to FIGS. 10 and 11, a blade 16 is illustrated with caps 50 disposed essentially along the entire length of the leading and trailing edges 24, 26. A plurality of actuation lines 64 are spaced apart along each of the edges 24, 26 and are attached to the head of the respective caps 50.

Referring to FIG. 10, the blade shell components 20, 22 can be formed in any conventional molding process within their respective molds 66. An amount of bond paste is placed along the bond line locations of the leading and trailing edges 24, 26. The respective caps 50 are then placed into one of the shell members at an initial position inboard of the bond paste along the respective edges 24, 26, with the head of the cap 50 oriented towards the respective edge 24, 26 and the trailing leg portions 56 spanning rearward from the head 52. It should also be appreciated that the previous two steps may be reversed, wherein the bond paste is placed into the shell member after the cap has been placed along the leading or trailing edge.

The actuation lines 64 that are attached to the cap head 52 are led out from the shell members 20, 22 and molds 66 beyond the leading and trailing edges 24, 26. The mold halves 66 are then closed and the actuation lines 64 are tensioned and pulled away from their respective edge 24, 26 so as to pull the cap 50 into its final operational configuration. Any manner of a mark or other indication may be provided on the actuation line 64 to indicate when the cap 50 is act its final operational position. Infusion of the shell members may then occur in the normal course.

Various method embodiments may also include trimming any excess bond paste 34 that has migrated out from the leading or trailing edges 24, 26 during the curing process. Additionally, the method may include measuring the amount of excess bond paste that is trimmed from the leading or trailing edge 24, 26 and reducing the amount of bond paste that is initially placed into a subsequent blade mold by the measured amount.

The actuation lines 64 may be trimmed after the bond paste 34 has cured, as indicated in FIGS. 5 and 9.

The present invention also encompasses any configuration of a wind turbine 10 (FIG. 1) wherein at least one of the blades 16 is configured with the unique advantages of the invention as discussed above.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for forming a bond between upper and lower shell members along at least one of the leading or trailing edges of a wind turbine blade, said method comprising:

placing an amount of bond paste along a defined bond line location of the leading or trailing edge;

placing a cap into one of the shell members at an initial position inboard of the bond paste along the bond line, the cap having a head oriented towards the leading or trailing edge and trailing leg portions that span rearward from said head, the trailing leg portions being straight and diverging from the head at a generally constant angle such that the head is defined as a point on the cap;

locating actuation lines attached to the cap head out from the shell member beyond the leading or trailing edge;

joining the shell members together along the leading and trailing edges such that the trailing leg portions of the cap are biased against the shell members;

pulling the actuation lines to move the cap towards the leading or trailing edge to an operational position that defines a desired bond width location; and wherein the cap defines a dam against migration of the bond paste into the internal cavity of the blade and the trailing leg portions compressing the bond paste and causing excess bond paste to be forced out from the leading or trailing edge as the cap is pulled towards its operational position.

2. The method as in claim 1, further comprising trimming excess bond paste that migrated out from the leading or trailing edge.

3. The method as in claim 2, further comprising measuring the amount of excess bond paste trimmed from the leading or trailing edge and reducing the amount of bond paste initially placed into a subsequent blade by the measured amount of trimmed bond paste.

4. The method as in claim 1, wherein the cap is applied along the trailing edge.

5. The method as in claim 1, further comprising forming the cap into a stiff, pre-formed shape prior to placing the cap into the shell member.

6. The method as in claim 1, further comprising trimming the actuation lines at the leading or trailing edge.

* * * * *